Dec. 9, 1952
E. V. BITTERLI ET AL
2,621,140
METHOD FOR MOLDING PROPELLER BLADES
Filed July 8, 1948
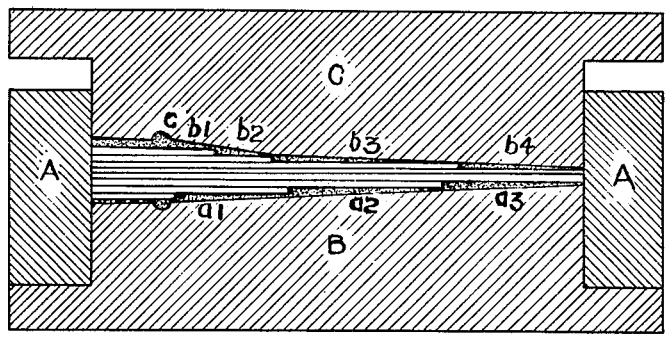
INVENTORS
EMILE V. BITTERLI
MAX FORRER, Deceased
BY ANNE MARIE JOUVET FORRER
WIDOW AND HEIR AND GUARDIAN OF
MINOR HEIRS
By
Adams & Bush
ATTORNEYS Patented Dec. 9, 1952

2,621,140

UNITED STATES PATENT OFFICE 2,621,140

METHOD FOR MOLDING PROPELLER BLADES

Emile V. Bitterli, Zurich, Switzerland, and Max Forrer, deceased, late of Paris, France, by Anne Marie Jouvet Forrer, Paris, France, widow and heir and guardian of minor heirs, assignors to Compagnie Generale d'Electricite, Paris, France, a corporation of France Application July 8, 1948, Serial No. 37,674
In France August 28, 1940

5 Claims. (Cl. 154—110)

The present invention relates to a method for molding propeller blades, reinforced with parallel fibers, together with an auxiliary isotropic molding material. Small plates having parallel reinforcements in a resinous binder may be partly polymerized and then molded together with a quantity of isotropic material to full polymerization. The isotropic material becomes integral with the partly polymerized reinforced plates.

It has been known in the prior art that plastic materials can be rendered particularly resistant from the mechanical point of view by incorporating therein fibers, for example, fibers of cotton or asbestos. These fibrous loadings or additions were at first distributed at random in the plastic material; these fibers were then oriented in all directions and the material obtained was substantially isotropic. Later there were produced materials reinforced with fibers oriented in one single plane by incorporating sheets of paper or tissues in the plastic material. The materials thus obtained are laminated or stratified and consequently anisotropic. Still later, the development has gone still further along this path by providing materials reinforced with individual fibers oriented in one single direction, that is, so reinforced with parallel fibers.

The materials with such parallel fibers are now very much in demand since they have a tensile strength in the direction of the fibers, which is very much higher than that of the laminated or stratified materials having a base of paper or tissues, and still higher than that of isotropic materials. They provide for the best possible utilization of the mechanical qualities of the fibers, the resistance to tension of each fiber being added to that of the neighboring fibers. The fact that the material thus reinforced develops its resistance or strength only in one single direction is, furthermore, not a disadvantage in many applications wherein the principal force which the pieces are called upon to resist acts only in one determined direction.

The present invention concerns plastic materials of this new anisotropic type which are armored or reinforced by fibers oriented for the most part in one single direction. Among these materials there can be mentioned as an example, synthetic resins of the phenol-formaldehyde type or the urea-formaldehyde type, reinforced with substantially parallel fibers of cotton or flax as described, for example, in British Patent No. 501,649, and the synthetic resins reinforced with substantially parallel fibers of glass, silica, quartz, or metal, as described for example in French Patent No. 855,731, or British Patent No. 591,135.

Our invention will be understood from the following specification and the accompanying drawing wherein the sole figure shows the die head and sleeve of the mold with the molded object in position in the mold cavity.

The molding of the mentioned materials of the prior art presents certain difficulties. As a particular example there will be considered the molding of a blade for the propeller of an airplane. Fibers incorporated in such a blade should have strength and offer resistance to fracture of the propeller by centrifugal force and hence should preferably be oriented in the direction of the length of the blade. In the prior art, this result is obtained by starting with a molding material wherein the fibers are already aligned parallel to each other, and by placing this material in the mold in such manner that the fibers will be parallel to the axis of the blade and maintain this direction during the molding operation. The molding material is then presented in the form of yarns, bundles, twists, braids, cables, or other cords composed of substantially parallel fibers, or of sheets of parallel threads, or of tissues or of fabrics having a number of threads which are preponderant in the warp or woof, impregnated, sheathed, covered or sweated by a binder material which is rigid when cold. These linear elements or flat pieces, rigid when cold, can be softened under the influence of heat and of pressure in the mold. However, they cannot stretch or lengthen under the applied molding pressure, since the filiform reinforcement resists; they should not be foldable since the fibers would not longer be parallel, they can at most stretch out in breadth and depth.

Since the blade of the propeller is relatively thick on the end of the heel and will become thinner and thinner toward the point of the blade, the linear elements or small flat pieces must be cut off at different lengths. In these prior art blades this results in a certain discontinuity in the distribution of the material in the mold, which discontinuity can appear, for example, as facets at the surface of the molded propeller, these facets corresponding to the points of cutting off the material. When the mold is closed on a material thus formed to present such facets, as in echelon, it exerts an excessive compression on the projecting edges of these elements, and an insufficient compression on what is located immediately beyond. The layers which are immediately below will be displaced by the local pressures which are impressed upon them by the plate elements. These layers can even be completely clipped off or sheared off by these plate elements.

In the manufacture of such blades as heretofore performed, the cutting off of the material and its orientation in the mold furthermore never correspond exactly at each place in the cross-section of the inside of the impression face of the die of the mold. Certain cross-sections receive too much material, other cross sections do not receive enough material. If there is used a pulverulent molding material for the whole blade, these inequalities disappear when the mold is closed, since then the plastified material automatically becomes distributed toward the places where material is lacking.

However, it does not act the same way in the case involving a material reinforced with threads. As previously stated, this material is displaced only in breadth and depth, by the spacing of the threads. The balancing of the pressure is then satisfactorily maintained on a given cross-section, in the breadth of the blade, perpendicular to the direction of the threads, but not along the length of the blade parallel to the threads. There are thus produced on the molded blade, sections of strong compression and high density of material, alternating with cross-sections of insufficient compression, and the material runs the risk of being poorly consolidated and porous.

In these methods of the prior art, these variable pressures applied to one given thread at two or more places along its length, have still other disadvantages. The threads themselves cannot be displaced along the direction of their axis, but the plastic binder material with which they are impregnated or sheathed or covered can be displaced in this direction. The binding material is, therefore, squeezed out from the cross-sections which are strongly compressed and gets lodged in nearby cross-sections which are less compressed. There result therefrom variations and non-uniformities in quantitative composition and in the density of the blade, at one or another cross-section.

Furthermore, in these methods of the prior art, a local pressure applied to a thread perpendicular to its axis is transformed into a tension applied to this thread. This applied tension is the greater according as the thread is less extensible. Now a stretched thread under tension and encased in polymerized resin, in this stretched condition, is nearer to rupture than a thread not so held under tension. The resistance of the blade of the propeller to rupture by tension, that is to say, by centrifugal force, becomes diminished by the amount of the tension which has been applied to the threads during the molding operation and is retained. It is therefore important to avoid the localized pressures which are retained in the threads and result in undesired initial tension.

An object of the present invention is to provide a molding process which avoids the difficulties due to the mentioned facet being so cut off, and improper distribution in the mold of the material reinforced with parallel fibers.

The essential characteristic of this process of the present invention consists in submitting to the molding operation, simultaneously and jointly, the anisotropic material consisting of preliminarily partly molded or polymerized small plates or pieces, essentially or exclusively composed of a binder and reinforcing threads or fibers oriented in large part in one given direction, together with a substantially isotropic material. After molding, this isotropic material together with the anisotropic material constitute an integral body. Because of its essential characteristics, this isotropic material can be displaced while within the mold in all directions as soon as it is plastified by the heat and pressure of the mold. Then it plays the role of a fluid distributor of pressure, that is, of a hydraulic cushion. It fills up the facets resulting from the cutting off operation performed on the material reinforced with threads, and it is displaced toward the zones where there is a lack of the material reinforced with threads. These zones hence receive the same unitary pressure as the other zones in which predominates the material reinforced with threads. They are all thus well compressed and compacted, and the binder is not concentrated at a particular section and the threads are not subjected to any local tension.

The isotropic material which is distributed by pressure can be placed either on the inside of the molded object, or at its surface, along its entire length, or only at certain points.

According to the present invention, this auxiliary isotropic maetrial can be constituted, for example, by a molding powder having a base of a synthetic resin of the phenol-formaldehyde type and of an appropriate pulverulent or fibrous loading content. As to this loading, the short fibers of the loading sawdust, cotton, paper paste, asbestos, or the like, will be positioned at random and not directionally oriented, in order to maintain the isotropic nature of the material and its mobility in all directions while in the plastic state. The isotropic material can also consist of a binder alone, for example, of a synthetic resin of the phenol-formaldehyde type, not loaded with sawdust or similar material. In many cases it will be an advantage to choose the same binder material for the anisotropic material and for the isotropic material, in order to obtain a good sweating or joining between the two materials and to avoid as far as possible internal tensions in the molded piece.

The employment concurrently with the anisotropic material, of an auxiliary isotropic material, as used in the present invention, facilitates the molding of complicated pieces having ribs, corners, or recesses, or engraved surfaces. As a practical matter, such anisotropic material in itself often lends itself very poorly to the molding of such pieces, the thread form of reinforcement not being able or suitable to abruptly change its direction. The isotropic material, however, can be freely displaced in the mold, filling all the corners and recesses and reproducing all the fine details of the die of the mold. Hence it suffices to place the partly polymerized anisotropic material or pieces in the interior of the piece which is to be molded, or on the smooth side of the latter, and to cover this anistropic piece or part with a covering of isotropic material, to obtain a molded piece which is well-worked and nevertheless is reinforced with parallel fibers.

In the previously cited example of a propeller blade, the employment of such auxiliary isotropic material according to the present invention, likewise offers some incidental advantages, providing that its composition is suitable therefor. For example, it can constitute a casing or cover which partially or entirely covers the propeller or the blade of the propeller and which constitutes an integral body therewith.

Such a covering can present importance for the following reasons: it better resists shocks, it better resists abrasion or humidity, than the underlying adjacent material; it replaces a costly varnish; it confers on the propeller a specially painted surface or a well-polished surface; the deburring or trimming of the molded blade or the machining of the edges are facilitated. If the isotropic material properly resists abrasion, it can be used for trimming the attack edge and the point of the propeller blade. The isotropic material can then replace the varnish, the covering with cellulose acetate, and the metallic attack edge and other coverings or reinforcement which at present it is necessary to apply to metallic propellers, wooden propellers, and the like.

According to the present invention, there can be given to the isotropic material a density in the finished molded state which is identical with or very close to that of the anisotropic material reinforced with threads in the completed molded state. Thus the center of gravity of the blade will not be affected by variations of the distribution of the isotropic material.

As a non-limiting example, there will now be described the production of a blade of a propeller molded according to the present invention.

The principal molding material, which is anisotropic, is presented in the form of sheets composed of parallel glass threads completely covered and connected together or sweated by a synthetic resin of the phenol-formaldehyde type, partially polymerized up to state B. The fibers preferably are of considerable length. Such anisotropic material and a method of its preparation have been described in French Patent No. 855,731 and British Patent No. 591,135, mentioned above.

The auxiliary isotropic molding material is a molding powder of the phenol-formaldehyde type and of a composition which is now used. This composition can, for example, be the following:

| | Parts |
|---|---|
| Polymerizable phenol-formaldehyde resin | 50 |
| Magnesia | 1 |
| Stearic acid | 1 |
| Wood dust | 48 |
| | 100 |

The steel mold is substantially composed of a sleeve, a lower die-head, and an upper die-head, and is usually positioned with the lower die-head as a base so that the plunger acts vertically.

The accompanying drawing shows a vertical section of the mold and its parts taken on the axis of the propeller blade, through the blade and its mold. The sleeve is shown, at A, the lower die-head is shown at B, and the upper die-head is shown at C.

Before molding, the stacked small sheets of partly polymerized anisotropic material of resinous type, reinforced with glass threads, or other threads, are properly trimmed off in such manner that when the assembly is placed in the mold, the fibers will be parallel to the axis of the propeller blade and so that the mold will be filled up as completely as possible. However, the edges of these small plates as cut off from abrupt facets which are approximately indicated on the drawing by $a_1, a_2 \ldots b_1, b_2 \ldots$ Furthermore the swelling or hub enlargement or flange $c$ of the heel of the blade cannot be molded of the anisotropic material which is reinforced with threads. The isotropic molding powder which is indicated on the drawing by solid black, goes to fill up these facets and the hub enlargement $c$.

In order to mold a blade, the lower die-head B working in sleeve A is first operated. In the molding die-chamber thus formed, there is first placed an appropriate quantity of the isotropic molding powder, such as a little more than is needed to fill up the facets $a_1, a_2, a_3 \ldots$ on the lower side of the blade and to fill the lower half of the hub enlargement or flange $c$, then the small plates of the partly polymerized material, reinforced with glass or other threads, and finally again an appropriate small quantity of the same isotropic molding powder, corresponding to the voids left by the facets $b_1, b_2, b_3; \ldots$ on the upper side of the blade and by the upper side of the hub enlargement or flange $c$ of the blade.

The upper die-head C working in the sleeve A is then closed down on lower die-head B. The mold has been preliminarily heated to the polymerizing temperature of the resin used; that is to say, to 160°–170° C. This mold is closed by a hydraulic compressor or plunger applying on the blade a pressure of 500–600 kilograms per square centimeter. After about one hour, as soon as the polymerization of the resin has been completed, the mold is opened and the completed molded blade is removed therefrom. The auxiliary isotropic material has been molded integrally with the preliminarily partly-polymerized, small, reinforced plates.

The two faces of the propeller blade as completed are thus covered with isotropic material while the inner core of the blade contains the anisotropic resinous material reinforced with glass threads, which gives to the combined structure the desired strength and resistance to the tension applied by centrifugal force when the propeller is rotating.

It will be understood that the present invention may be applied not only to the production of propeller blades, but to all molded objects which comprise anisotropic material which is substantially or exclusively composed of a binder and of threads or fibers which are, in large part, oriented in one given direction.

It will be apparent to those skilled in the art that our invention is susceptible of modification to adapt the same to particular conditions, and all such modifications which are comprehended within the scope of the appended claims, we consider to be within the spirit of our invention.

We claim:

1. In the die molding of sloping echelon contoured objects having unidirectional filiform reinforcements, the method of avoiding initial tensions in the product produced during molding which consists in first applying to one face of the die cavity a first small quantity of polymerizable isotropic molding powder, then applying a stack of partially polymerized resinous flat plates which contain substantially parallel filiform reinforcements extending in the direction of application of maximum tension to the finished product in use, said stack being echelon-trimmed to approximately fill the die cavity and forming an echelon, applying a second small quantity of the same isotropic molding powder to the side of said stack opposite to the side thereof in contact with said first small quantity of isotropic molding powder, the quantity of said isotropic molding powder so applied being sufficient to fill all the voids of said echelon between the facets of said echelon trimmed stack and the walls of said die cavity, and applying to said mold cavity simultaneously containing said stack and said powder, heat and pressure sufficient to complete polymerization of said stack and said two quantities of powder as an integral molded article, whereby the product has a continuous, smooth, isotropic outer surface, and substantially no initial tension produced during molding.

2. The method according to claim 1, said isotropic molding powder having a resinous component which is the same as the resinous component of said array of resinous plates.

3. The method, according to claim 1, in which said isotropic molding powder has a density in the finished molded state which is substantially identical to the density of the resinous plates.

4. In the die-molding of a propeller blade having a flanged hub portion and a filiform reinforced blade portion, the method of avoiding initial tensions in the product produced during molding which consists in first applying to one face of the die-cavity a first small quantity of polymerizable, isotropic molding powder, then applying a stack of partially polymerized resinous flat plates which have substantially parallel filiform reinforcements extending in the direction of the axis of the blade, said stack being trimmed in echelon to substantially the form of the blade portion and the core of the hub portion exclusive of the flanged hub portion as determined by the mold cavity and having echelon facets at the point of terminating by trimming individual plates of said stack, applying a second small quantity of the same isotropic molding powder to the side of said stack opposite to the side thereof in contact with said first small quantity of isotropic molding powder, said quantities of isotropic molding powder being of a magnitude to fill the portions of the die-cavity between the facets of said echelons and the wall of said cavity and the portions thereof occupied by the flange of said hub portion, and applying to said mold cavity simultaneously containing said stack and said powder, heat and pressure sufficient to complete polymerization of said stack and said two quantities of molding powder as an integral molded article, whereby the product has a continuous, smooth, isotropic outer surface and substantially no initial tension produced during molding.

5. The method of claim 4, said isotropic molding powder being constituted substantially half of wood dust as a loading material.

EMILE V. BITTERLI.
ANNE MARIE JOUVET FORRER,
*Individually as Widow, and Also as Guardian of Her Minor Children Anne Marie Marthe Sylvie Forrer and Caroline Forrer, Heirs-at-Law of Max Forrer, Deceased.*

REFERENCES CITED

The following references are of record in the file of this patent:

UNITED STATES PATENTS

| Number | Name | Date |
|---|---|---|
| 1,567,574 | Clay | Dec. 29, 1925 |
| 1,891,918 | Dillehay | Dec. 27, 1932 |
| 2,202,014 | Longheed | May 28, 1940 |
| 2,423,647 | Gurvitch | July 8, 1947 |
| 2,451,483 | Goldsmith | Oct. 19, 1948 |